(12) United States Patent
Bookbinder et al.

(10) Patent No.: US 11,407,682 B2
(45) Date of Patent: Aug. 9, 2022

(54) HIGH SPEED DRAW OPTICAL FIBER COATING SYSTEM AND METHOD

(71) Applicant: CORNING INCORPORATED, Corning, NY (US)

(72) Inventors: Dana Craig Bookbinder, Corning, NY (US); Pushkar Tandon, Painted Post, NY (US); Ruchi Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 11 days.

(21) Appl. No.: 16/930,723

(22) Filed: Jul. 16, 2020

(65) Prior Publication Data

US 2021/0032160 A1    Feb. 4, 2021

Related U.S. Application Data

(60) Provisional application No. 62/880,236, filed on Jul. 30, 2019.

(51) Int. Cl.
*C03C 25/20* (2006.01)
*C03B 37/025* (2006.01)
(Continued)

(52) U.S. Cl.
CPC ............ *C03C 25/20* (2013.01); *C03B 37/027* (2013.01); *C03B 37/032* (2013.01); *C03C 13/04* (2013.01);
(Continued)

(58) Field of Classification Search
CPC ........ C03B 37/025; C03C 25/18; C03C 25/20
See application file for complete search history.

(56) References Cited

U.S. PATENT DOCUMENTS 6,628,875 B2    9/2003   Baker et al.
6,715,323 B1 *  4/2004   Roba ................ C03B 37/02718
                                                        65/434
(Continued)

FOREIGN PATENT DOCUMENTS

EP    0854022 A1 *  7/1998   ........... G02B 6/4479
EP    2388239 A1    11/2011

OTHER PUBLICATIONS

International Search Report and Written Opinion of the International Searching Authority; PCT/US2020/041753; dated Oct. 9, 2020; 9 Pages; European Patent Office.

*Primary Examiner* — Cynthia Szewczyk
(74) *Attorney, Agent, or Firm* — Kevin L. Bray (57) ABSTRACT

An optical fiber draw system and method of coating an optical fiber. The system includes a furnace for heating an optical fiber preform, a draw assembly for drawing the optical fiber at a draw speed greater than 50 meters per second, a first coating applicator for applying a first coating onto the fiber, and a first curing assembly comprising a first plurality of light sources comprising light-emitting diodes for partially curing the first coating. The optical fiber draw system also includes a second coating applicator for applying a second coating onto the fiber on top of the first coating, and a second curing system comprising a second plurality of light sources for curing the second coating, wherein the first coating is further cured in the range of 15-50 percent after leaving the first curing assembly.

19 Claims, 4 Drawing Sheets

(51) Int. Cl.
    *C03B 37/027*     (2006.01)
    *C03B 37/03*     (2006.01)
    *C03C 13/04*     (2006.01)
    *C03C 25/1065*     (2018.01)
    *C03C 25/285*     (2018.01)

(52) U.S. Cl.
    CPC ........ *C03C 25/1065* (2013.01); *C03C 25/285* (2013.01); *C03B 2205/42* (2013.01); *C03C 2213/00* (2013.01)

(56) References Cited

U.S. PATENT DOCUMENTS

| | | |
|---|---|---|
| 7,399,982 B2 | 7/2008 | Siegel |
| 9,794,795 B1 | 10/2017 | Kruh et al. |
| 2005/0222295 A1 | 10/2005 | Siegel |
| 2008/0226913 A1 | 9/2008 | Cattron et al. |
| 2010/0242299 A1 | 9/2010 | Siegel |
| 2011/0038593 A1 | 2/2011 | Chien et al. |
| 2012/0196122 A1* | 8/2012 | Bishop .................. C08G 18/672 427/513 |
| 2013/0118208 A1* | 5/2013 | Okada .................... C03C 25/105 65/432 |
| 2017/0107145 A1 | 4/2017 | Suyama et al. |
| 2018/0127593 A1 | 5/2018 | Chen et al. |
| 2018/0163075 A1 | 6/2018 | Ren et al. |

* cited by examiner

HIGH SPEED DRAW OPTICAL FIBER COATING SYSTEM AND METHOD

This application claims the benefit of priority to U.S. Provisional Application Ser. No. 62/880,236 filed on Jul. 30, 2019, the content of which is relied upon and incorporated herein by reference in its entirety.

FIELD OF THE DISCLOSURE

The present invention is generally directed to methods and systems for curing coatings, and more particularly relates to a method and system for curing coatings positioned on optical fibers.

BACKGROUND OF THE DISCLOSURE

Optical fibers are generally manufactured to include an inner glass core surrounded by a glass cladding and multiple layers of coatings for bend and damage resistance performance. Optical fibers currently are typically manufactured with three coating layers of ultraviolet (UV) curable acrylate polymers. A first coating layer applied onto the outer surface of the optical glass cladding serves as the primary coating layer that acts as an absorbing layer and prevents thermal and mechanical stresses induced in the cable from transferring to the glass. The second coating layer is a high modulus secondary layer which is hard and abrasion resistant. The third coating layer is a thin ink tertiary layer that is applied onto the outside of the fiber for identification purposes and this layer is also a high modulus layer that contributes to the abrasion and puncture resistance performance of the fiber.

The individual coatings which are radiation (e.g., UV) curable are typically applied during drawing of the optical fiber. Radiation in the form of ultraviolet light is often supplied by mercury discharge lamps to cure the coatings. Mercury discharge lamps typically emit a broad spectrum of ultraviolet light and have relatively low efficiency. It would be desirable to provide for alternative curing techniques which allow for high speed draw and coating of the fiber.

SUMMARY OF THE DISCLOSURE

According to one embodiment, an optical fiber draw system is provided. The optical fiber draw system includes a furnace for heating an optical fiber preform, a draw assembly for drawing a glass fiber from the optical fiber preform at a draw speed greater than 50 meters per second, a first coating applicator for applying a first coating composition onto the glass fiber, the first coating composition comprising a first photoinitiator, the first photoinitiator absorbing at a first wavelength, and a first curing assembly comprising a first plurality of light sources comprising light-emitting diodes, the first plurality of light sources emitting at the first wavelength, the first curing assembly configured to cure the first coating composition to a first degree of cure with the emission at the first wavelength. The optical fiber draw system also includes a second coating applicator for applying a second coating composition onto the first coating composition having the first degree of cure, the second coating composition comprising a second photoinitiator, the second photoinitiator absorbing at a second wavelength, a second curing assembly comprising a second plurality of light sources, the second plurality of light sources emitting at the second wavelength, the second curing assembly configured to cure the second coating composition with the emission at the second wavelength, the second curing assembly further configured to cure the first coating composition to a second degree of cure, wherein a difference between the second degree of cure and the first degree of cure is in the range of 15%-50%.

According to another embodiment, a method of coating an optical fiber is provided. The method includes the steps of drawing a glass fiber from an optical fiber preform at a draw speed greater than 50 meters per second, applying a first coating composition directly onto the glass fiber, wherein the first coating composition comprises a first photoinitiator, the first photoinitiator absorbing at a first wavelength, and partially curing the first coating composition to a first degree of cure with a first plurality of light sources, the first plurality of light sources comprising a first plurality of light-emitting diodes, the first plurality of light-emitting diodes emitting the first wavelength. The method also includes the steps of applying a second coating composition directly onto the partially cured first coating composition having the first degree of cure, the second coating composition comprising a second photoinitiator, the second photoinitiator absorbing a second wavelength, and at least partially curing the second coating composition with a second plurality of light sources, the second plurality of light sources emitting the second wavelength, the second plurality of light sources further curing the partially cured first coating composition to a second degree of cure, wherein a difference between the second degree of cure and the first degree of cure is in the range of 15%-50%.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be transient, removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Reference will now be made in detail to the present preferred embodiments of the disclosure, examples of which are illustrated in the accompanying drawings. Whenever possible, the same reference numbers will be used throughout the drawings to refer to the same or like parts. An example of an optical fiber and a preferred embodiment of the manufacture of the optical fiber and an optical fiber coating and curing system for coating and curing the fiber during manufacture is shown in FIGS. 1-6.

Figure 1:
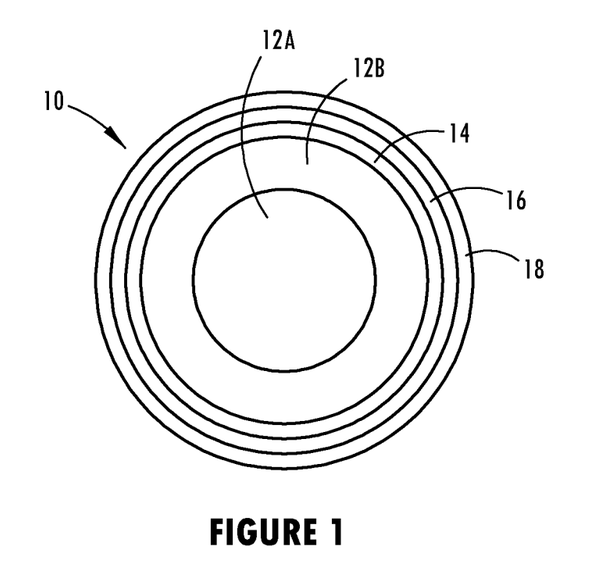
FIG. 1 is an end view of an optical fiber having three coating layers, according to one embodiment.

Referring now to FIG. 1, an exemplary coated optical fiber is shown generally designated by reference numeral 10, according to one example. The coated optical fiber 10 includes a glass fiber 12 with a glass core 12A surrounded by a glass cladding 12B, both generally made of glass such as silica or doped silica. The coated optical fiber 10 also includes a plurality of protective coating layers that surround the generally cylindrical outer surface of the glass cladding 12B.

In the example shown and described herein, the coated optical fiber 10 has three radiation curable acrylate polymer coating layers that provide bend and damage resistance performance. A first or primary coating 14 applied onto and surrounding the outer surface of the glass cladding 12B is a soft low modulus primary coating that acts as an absorbing layer and prevents thermal and mechanical stresses induced in the coated optical fiber 10 from transferring to the glass core 12A and the glass cladding 12B. The primary coating 14 may have a modulus of less than 1.5 MPa at room temperature (e.g., 23° C.). A second or secondary coating 16 applied over and surrounding the primary coating 14 provides a high modulus secondary layer, which is hard and abrasion resistant. The secondary coating 16 may have a modulus greater than 1,000 MPa at room temperature. A third or ink tertiary coating 18 applied over and surrounding the surface of the secondary coating 16 serves as a thin ink tertiary coating which is the outermost layer of the coated optical fiber 10 and may include color and/or print to be used for identification purposes. The ink tertiary coating 18 may also have a high modulus, such as greater than 1,000 MPa, or more particularly greater than 1,500 MPa or typically greater than 2,000 MPa at room temperature. The ink tertiary coating 18 may also contribute to the abrasion/puncture resistance performance of the coated optical fiber 10.

Figure 2:
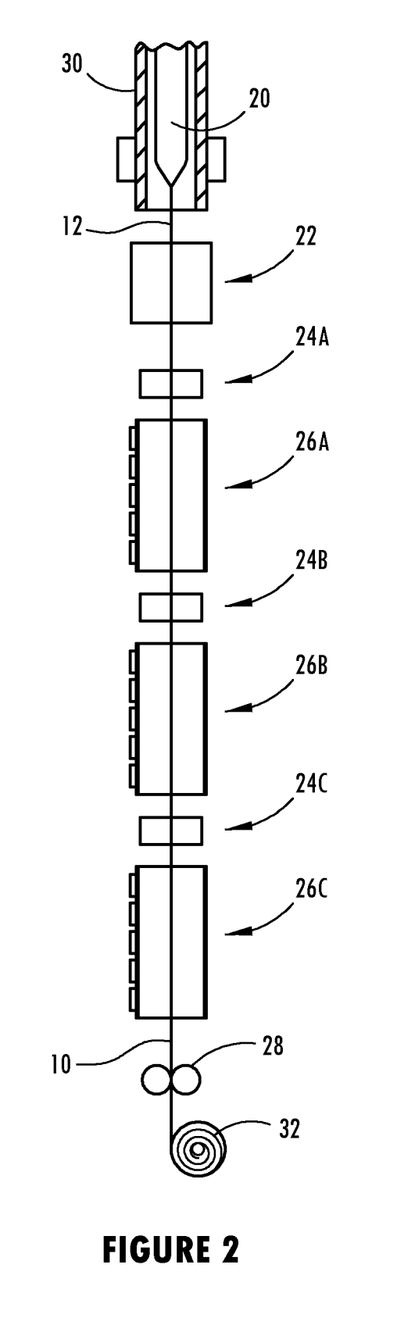
FIG. 2 is a schematic block diagram of an optical fiber production/draw system employing optical fiber coating and curing assemblies, according to one embodiment.

Referring to FIG. 2, a schematic of an optical fiber draw tower and coating manufacturing process for forming the coated optical fiber 10 is illustrated generally in a block diagram representation, according to one embodiment. Typically, the optical fiber 10 is drawn in a fiber draw system that employs a glass preform 20 which is heated in a furnace typically at a temperature around 2000° C. The heated glass preform 20 forms a molten tip that forms onto a glass fiber 12 that is drawn typically with a pair of tractors 28 to draw the fiber from the molten tip of the glass, at a draw speed such as a draw speed greater than 50 m/sec. The glass fiber 12 having the glass core 12A and glass cladding 12B exits the furnace and passes through a cooling tube 22 to cool and solidify the glass, and thereafter may be sequentially coated with the protective coating layers to form coated optical fiber 10.

In the embodiment shown, the cooled glass fiber 12 is first drawn through a first or primary coating applicator 24A to apply a radiation, e.g., ultraviolet (UV) radiation, curable primary coating composition onto the outer surface of the glass cladding 12B. The primary coating composition in primary coating applicator 24A is a viscous liquid and typically comprises one or more acrylate compounds. Primary coating 14 is a cured product of the primary coating composition and the one or more acrylate compounds of the primary coating composition are selected to provide a cured product having a modulus suitable for use as a primary coating of an optical fiber. The optical fiber 10 with the liquid primary coating composition subsequently passes through a first curing assembly 26A having a first plurality of UV radiation curing lamps that partially cure the primary coating composition. Next, the optical fiber with the partially cured primary coating composition passes through a second or secondary coating applicator 24B to apply a radiation, e.g., UV radiation, curable secondary coating composition on top of the partially cured primary coating composition. The secondary coating composition in secondary coating applicator 24B is a viscous liquid and typically comprises one or more acrylate compounds. Secondary coating 16 is a cured product of the secondary coating composition and the one or more acrylate compounds of the secondary coating composition are selected to provide a cured product having a modulus suitable for use as a secondary coating of an optical fiber. The optical fiber with the secondary coating composition then passes through a second curing assembly 26B having a second plurality of UV radiation curing lamps to at least partially cure the secondary coating composition. The optical fiber with the partially cured primary coating composition and at least partially cured secondary coating composition then passes through a third or tertiary/ink coating applicator 24C to apply a radiation, e.g., UV radiation, curable ink tertiary coating composition on top of the at least partially cured secondary coating composition. The ink tertiary coating composition is typically similar in composition to the secondary coating composition and forms ink tertiary coating layer 18 when cured. The optical fiber with the ink tertiary coating composition then passes through a third curing assembly 26C having a third plurality of UV radiation curing lamps to cure and solidify the tertiary ink coating composition to form ink tertiary coating layer 18 to form coated optical fiber 10. The primary coating composition may be further cured by one or both of the second and third curing assemblies 26B and 26C as described herein. The coated optical fiber 10 with the three cured coatings 14, 16 and 18 is pulled through the coating applicators and curing lamps by the pair of tractors 28 and may be wound onto on a spool 32.

The primary, secondary, and ink tertiary coating compositions may be applied and at least partially cured sequentially in succession between the fiber cooling and tractor draw/winding operations with the fiber draw process operating at a draw speed greater than 40 m/s or greater than 50 meters/second (m/sec), such as speeds of 60 m/sec or greater, 70 m/sec or greater, 80 m/sec or greater, or 100 m/sec or greater. Each of the primary coating applicator 24A, secondary coating applicator 24B and tertiary/ink coating applicator 24C may include an optical fiber coating die assembly for applying the corresponding coating composition onto the outer surface of the optical fiber. Each of the first, second and third curing lamp assemblies 26A, 26B and 26C may include radiation curing lamps such as an arrangement of UV radiation lamps in a stacked assembly as shown in FIGS. 3 and 4, with differing arrangements of light sources as described herein.

Figure 3:
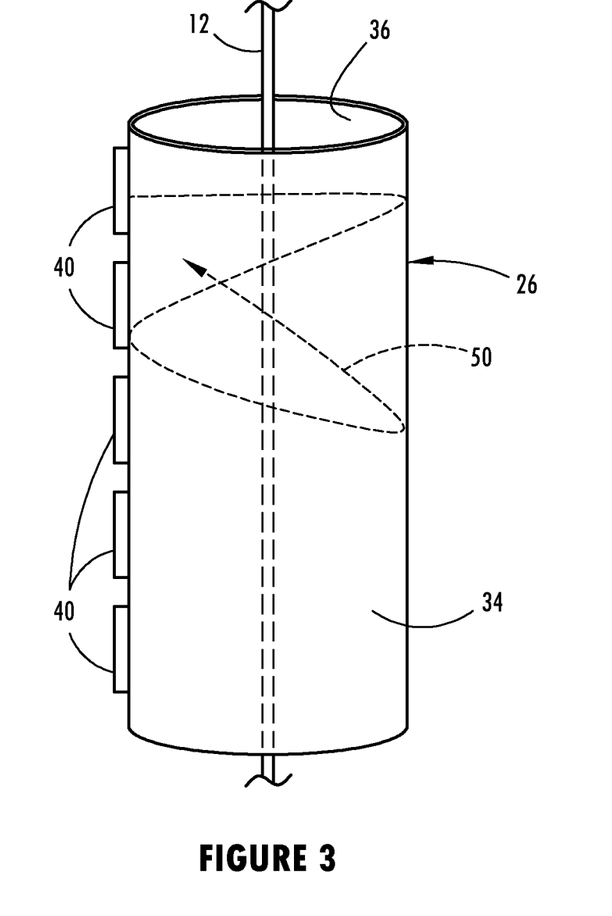
FIG. 3 is an elevated perspective view of a radiation curing assembly employed in the fiber production/draw system shown in FIG. 2.
Figure 4:
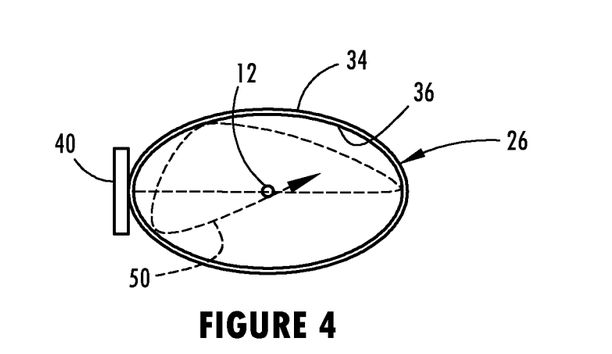
FIG. 4 is a top view of the radiation curing assembly shown in FIG. 3.

Referring to FIGS. 3 and 4, one example of a radiation curing assembly 26 is illustrated. It should be appreciated that the radiation curing assembly 26 may represent any of the first radiation curing assembly 26A, the second radiation curing assembly 26B and the third or tertiary ink radiation curing assembly 26C. The radiation curing assembly 26 has a tube 34 that generally defines an opening which is shown having an oblong configuration, according to one embodiment. It should be appreciated that the tube 34 may have other configurations such as a cylindrical shape and may have a cross section that is substantially circular, oval, triangular, square, rectangular, pentagonal, or higher order polygons. The tube 34 has an inner surface which is coated with a reflective material so as to provide a reflective inner surface 36 that reflects incident radiation. Arranged along one side of the tube 34 and spaced longitudinally along the tube 34 are a plurality of light sources 40 which are configured as UV radiation light-emitting diode arrays according to one embodiment and as broadband lamps that emit UV radiation (e.g. Hg lamp) according to another embodiment. Each of the light sources 40 is shown located along one side of the tube 34; however, the plurality of light sources may be located at different positions around the tube 34 both longitudinally and laterally, according to other embodiments. Each of the plurality of light sources 40 in one embodiment has a plurality of UV radiation emitting light-emitting diodes which emit ultraviolet light 50 at a specific peak wavelength with a narrow linewidth. It should be appreciated that the peak wavelength of the light-emitting diodes may be selected such that the radiation curing assembly 26 is operable to activate a photoinitiator in one or more of the coating compositions to promote curing of the one or more coating compositions. As such, the peak wavelength of the UV emitting light-emitting diodes in the radiation curing assembly 26 is selected to match an absorption wavelength of the photoinitiator that is provided in a coating composition that is cured as the fiber passes through the radiation curing assembly 26. For example, for the first UV radiation curing assembly 26A, the light sources 40 are UV emitting light-emitting diodes selected to have a peak wavelength that matches an absorption wavelength of a first photoinitiator in the primary coating composition operable to activate curing of the primary coating composition, whereas for the second radiation curing assembly 26B, the light sources 40 are UV light-emitting diodes or a broadband lamp that emits a wavelength that matches an absorption wavelength of a second photoinitiator operable to activate curing of the secondary coating composition. The light sources 40 of the second curing lamp assembly 26B may further emit one or more UV wavelengths operable to activate the first photoinitiator of the primary coating composition to further cure the primary coating composition as the optical fiber passes through the second curing lamp assembly 26B, according to one embodiment.

The primary coating composition is applied directly to the exterior surface of the cladding 12B of the glass fiber 12 and cured to form primary coating 14. The primary coating 14 may be a soft (e.g., low modulus) coating which dissipates forces that would otherwise reach the interior of the coated optical fiber 10 and prevents the forces from being transferred to the core 12A and/or cladding 12B. The primary coating 14 may be advantageous in dissipating stresses that arise when the coated optical fiber 10 is bent. The primary coating composition when applied to cladding 12B and primary coating 14 may each have a thickness of about 20 µm, about 30 µm, or about 40 µm, or about 44 µm, or about 48 µm, or about 52 µm, or about 56 µm, or about 60 µm, or about 64 µm, or about 65 µm, or about 66 µm, or about 68 µm, or about 72 µm, or about 76 µm, or about 80 µm or any and all values and ranges between these values.

The primary coating 14 may be the cured product of a radiation-curable primary coating composition (e.g., a first coating composition) which is applied to the cladding 12B of the glass fiber 12 by primary coating applicator 24A. The primary coating composition may include an oligomer and at least one monomer. The primary coating composition used in forming the primary coating 14 may also include photoinitiators, antioxidants, and/or other additives. According to various examples, the oligomer and monomer(s) of the primary coating composition are (meth)acrylate-based, where the term "(meth)acrylate" means acrylate, methacrylate, or combinations thereof. The oligomer may be, for example, a urethane (meth)acrylate oligomer, but it will be understood that other oligomers such as epoxy, vinyl ether, and thiolene, may be used without departing from the teachings provided herein. One group of suitable monomers for use in the monomer component includes alkoxylated (meth)acrylates, ethoxylated (meth)acrylates, ethoxylated alkylphenol mono(meth)acrylates, propylene oxide (meth) acrylates, n-propylene oxide (meth)acrylates, iso-propylene oxide (meth)acrylates, monofunctional (meth)acrylates, multifunctional (meth)acrylates, and combinations thereof.

The total oligomer content of the primary coating composition may be between about 5 wt % and about 95 wt %, or from about 25 wt % and about 75 wt %, or from about 40 wt % and about 60 wt %. As used herein, the weight percent of a particular component refers to the amount introduced into the bulk composition excluding an adhesion promoter and other additives. The monomer component of the primary curable composition is generally selected to be compatible with the oligomer, to provide a low viscosity formulation, to increase the refractive index of the primary coating 14, and/or to confer a desirable degree of hydrophilicity on the cured polymeric material of the primary coating 14. The monomeric component may be present in the primary curable composition in an amount of from about 5 wt % to about 95 wt %, or from about 5 wt % to about 60 wt %, or from about 20 wt % to about 50 wt %.

The secondary coating 16 may be the cured product of a radiation-curable secondary coating composition (e.g., a second coating composition) which has been polymerized (i.e., cured). The secondary coating composition may contain urethane acrylate compounds that form cross-links when the secondary coating composition is cured. The secondary coating 16 is in direct contact with the primary coating 14 and is typically a high modulus material that functions as a tough layer to protect the coated optical fiber 10 from environmental exposure and mechanical damage. The secondary coating composition when applied to the partially cured primary coating composition and the secondary coating 16 may each have a thickness of about 10 µm, or about 12 µm, or about 14 µm, or about 16 µm, or about 18 µm, or about 20 µm, or about 22 µm, or about 24 µm, or about 26 µm, or about 28 µm, or about 30 µm, or about 32 µm, or about 34 µm or any and all values and ranges between these values.

Although depicted as a distinct layer in direct contact with the secondary coating 16 in FIG. 1, the tertiary ink layer 18 may be positioned directly on the primary coating 14, according to another example. The tertiary ink layer 18 is the cured product of a radiation-curable ink tertiary composition (e.g., a third coating composition). The ink tertiary composition may include one or more curable monomers, one or more curable oligomers, one or more pigments, one or more optical brighteners and/or other constituents, such as the additives noted above. The one or more pigments may be present in the ink tertiary composition in an amount in the range from about 0.5 wt % to about 20 wt %, or in the range from about 1 wt % to about 15 wt %, or in the range from about 2 wt % to about 10 wt %. The one or more optical brighteners may be present in the ink tertiary composition in an amount in the range from about 0.5 wt % to about 20 wt %, or in the range from about 1 wt % to about 15 wt %, or in the range from about 2 wt % to about 10 wt %. The ink tertiary composition may also include up to 25 wt % of a dispersant to promote a more uniform, less aggregated distribution of the pigment. The ink tertiary composition when applied to the at least partially cured secondary coating composition and the ink tertiary coating 18 may each have a thickness (i.e., in the cured and/or uncured state) of about 0.5 µm, or about 1.0 µm, or about 1.5 µm, or about 2.0 µm, or about 2.5 µm, or about 3.0 µm, or about 3.5 µm, or about 4.0 µm, or about 4.5 µm, or about 5.0 µm, or about 5.5 µm, or about 6.0 µm, or about 6.5 µm, or about 7.0 µm, or about 7.5 µm or about 8.0 µm or any and all values and ranges between these values.

The primary coating composition, the secondary coating composition and the ink tertiary coating composition each includes a photoinitiator that is selected with radiation absorbing properties at a desired wavelength such that different radiation wavelengths may be used to cure different coatings having different selected photoinitiators. The photoinitiator may absorb light at or about a certain wavelength and initiate curing of the different compositions upon exposure to ultraviolet radiation, according to one embodiment. Suitable photoinitiators for the coating compositions include 1-hydroxycyclohexylphenyl ketone, bis(2,6-dimethoxybenzoyl)-2,4,4-trimethylpentylphosphine oxide, 2,2-dimethoxy-2-phenylacetophenone, bis(2,4,6-trimethylbenzoyl)-phenylphosphine oxide, (2,4,6-trimethylbenzoyl)diphenyl phosphine oxide, ethoxy(2,4,6-trimethylbenzoyl)-phenylphosphine oxide, other photoinitiators and/or combinations thereof. The photoinitiator may be present in the primary coating composition, the secondary coating composition and the ink tertiary coating composition in an amount from about 0.50 wt % to about 5.0 wt %, or from about 1.0 wt % to about 3.0 wt %. In other terms, the primary coating composition, the secondary coating composition and the ink tertiary coating composition may include the photoinitiator at a concentration of from about 0.010 mol/L to about 0.060 mol/L, or from about 0.010 mol/L to about 0.050 mol/L, 0.010 mol/L to about 0.043 mol/L, or from about 0.010 mol/L to about 0.035 mol/L.

Each of the plurality of light sources 40 may be composed of an array of light-emitting diodes arranged to emit the light 50 toward a central axis of the tube 34. According to various embodiments, the light-emitting-diodes may be configured to emit ultraviolet light and/or short-wave visible light as the light for curing one or more of the coating compositions through excitation of a photoinitiator. The light-emitting diodes may emit a relatively monochromatic band of ultraviolet and/or short-wave visible light that is centered at a specified peak wavelength; whereas conventional ultraviolet light sources (e.g., arc, mercury vapor, and microwave systems) tend to be broadband emitters with a range of output wavelengths, typically between 200 and 445 nm. Exemplary peak wavelengths for the plurality of light sources 40 may be 365 nm, 385 nm, 395 nm and/or 405 nm.

According to various examples, the ultraviolet light and/or short-wave visible light emitted from one or more of the plurality of light sources 40 may have a peak wavelength within a wavelength range of from about 250 nm to 410 nm, or from about 270 nm to about 400 nm, or from about 290 nm to about 400 nm, or from about 310 nm to about 400 nm, or from about 330 nm to about 400 nm. It will be understood that each of the plurality of light sources 40 may emit the same or different wavelengths of light than one another. Further, as the plurality of light sources 40 may be composed of an array of light-emitting diodes that includes light-emitting diodes operating at different peak wavelengths, the wavelength and/or intensity of the light 50 emitted may vary across the length of the light source 40 or between different light sources 40 within the plurality of light sources. Such a feature may be advantageous in preferentially curing one or more of the primary coating composition, the secondary coating composition and the ink tertiary coating composition. For example, an upper portion of the plurality of light sources 40 may be configured to emit a higher intensity light 50 which is configured to cure the primary coating composition while lower portions of the plurality of light sources 40 may be configured to emit the light 50 at a different intensity and different wavelength for curing the secondary coating composition and/or the ink tertiary coating composition. Such a feature may be advantageous in selectively curing the primary coating composition, the secondary coating composition and/or the ink tertiary coating composition while the coating and curing assemblies are operating in a wet-on-wet mode. In the wet-on-wet mode, two or more radiation-curable coating compositions are applied sequentially and subsequently cured in an optical fiber curing assembly comprising a plurality of radiation curing light sources.

Examples of suitable photoinitiators that may be used for curing one or more of the primary, secondary, and ink tertiary coating compositions on the optical fiber with UV radiation and selected peak absorption wavelengths associated with each photoinitiator are listed in Table 1 below.

TABLE 1

| Photoiniator | Peak Absorption Wavelength(s) (nm) |
|---|---|
| 2,4,6-trimethylbenzoyl-diphenylphosphine oxide | 295, 368, 380, 393 |
| 1-hydroxycyclohexylphenyl ketone | 248, 280, 333 |
| 2,2-dimethoxyl-2-phenyl acetophenone | 310, 350 |
| bis(2,4,6-trimethylbenzoyl)phenyl phosphine oxide | 350 |
| (2,4,6-triiethylbenzoyl)diphenyl phosphine oxide | 240, 272, 380 |
| alpha-hydroketone (MAPO) | 240, 272, 381 |
| 2-Hydroxy2-methyl-1-phenyl-1 propanone | 245, 280, 331 |
| Methylbenzoylformate | 255, 325 |
| Oxy-phenyl-acetic acid 2-[2 oxo-2-phenyl-acetoxy-ethoxy]-ethyl ester and oxy-phenyl-acetic 2-[2-hydroxyethoxy]-ethyl ester | 255, 325 |
| BAPO dispersion (Irgacure 819 (45% active) dispersed in water) | 295, 370 |
| BAPO/alpha-hydroxy ketone (Irgacure 819 (20%)) | 246, 282, 370 |
| Phospine Oxide | 275, 300 |
| Iodonium, (4methylphenyl) [4-(2-methylpropyl) phenyl], hexafluorophosphare (1) | 242 |

As illustrated in Table 1, a wide variety of photoinitiators exists that have peak absorption wavelengths that vary from one another. As such, a first photoinitiator may be selected for use in a first radiation-curable composition used to form a first coating which has a peak absorption wavelength that is activated to cure the first radiation-curable composition of the first coating when illuminated with radiation at that corresponding wavelength. A second photoinitiator in a second radiation-curable composition used to form a second coating may be selected having a peak absorption that is different from the peak absorption of the first photoinitiator and that is activated to cure the second radiation-curable coating composition at the corresponding wavelength. As such, the first coating composition may be cured by first light sources emitting radiation at a wavelength that activates a first photoinitiator to cure the first coating composition, and light sources having a wavelength that match an absorption wavelength of the second photoinitiator may be employed to cure the second coating composition. Additionally, a third coating composition may employ a third photoinitiator having an absorption wavelength that matches the radiation emitted from a third light sources so as to be activated to cure the third coating composition. The first, second and third photoinitiators may be selected from the examples shown in Table 1 above or from other known photoinitiators.

The light sources 40 used in curing assemblies 26A, 26B, and 26C may be of the same type or a different type. In one embodiment, all light sources 40 are light emitting diodes. In another embodiment, all light sources 40 in one of curing assemblies 26A, 26B and 26C are light emitting diodes and the light sources 40 in the remaining curing assemblies are light-emitting diodes, broadband lamps, or a combination thereof. For example, in one embodiment, all light sources 40 of primary curing assembly 26A are light emitting diodes and all light sources of secondary curing assembly 26B and ink tertiary curing assembly 26C are broadband lamps. In still another embodiment, all light sources 40 in two of curing assemblies 26A, 26B and 26C are light emitting diodes and the light sources 40 in the remaining curing assembly are light-emitting diodes, broadband lamps, or a combination thereof.

In the examples that follow, the degree of cure of a representative primary coating composition upon excitation with a UV LED source at various excitation intensities is presented. Degree of cure measurements in these examples were calculated using modelling of the polymerization reaction. The degree of cure may also be measured using a Fourier transform infrared (FTIR) method.

As used herein, degree of cure refers to percent cure (% cure) where percent cure is calculated from the peak area (PA) of the acrylate spectral band extending from 1396 cm$^{-1}$-1419 cm$^{-1}$ using Eq. (1):

$$\% \text{ cure} = \frac{PA_{uncured} - PA_{sample}}{PA_{uncured} - PA_{fullycured}} \times 100 \qquad (1)$$

$PA_{uncured}$ corresponds to the uncured peak area before exposure to curing radiation, $PA_{fully\ cured}$ corresponds to the peak area of the fully cured state, and $PA_{sample}$ corresponds to the peak area at intermediate times between the uncured and fully cured states. The % cure represents the time-dependent conversion of acrylate double bonds and may also be referred to herein as conversion or % conversion or %. In some of the examples, the degree of cure of a coating composition in different states of cure or at different times in a curing process are compared. The comparison is expressed as a difference between the degree of cure (as determined by Eq. (1)) of the coating composition at one state or one time and the degree of cure (as determined by Eq. (1)) of the coating composition at another state or another time. By way of example, in some embodiments a primary coating composition is partially cured in a primary curing assembly and is further cured in a secondary curing assembly. In such embodiments, the extent to which the primary coating composition is further cured in the secondary curing assembly is expressed as the difference between the degree of cure of the primary coating composition as the fiber exits the secondary curing assembly and the degree of cure of the primary coating composition as the fiber exits the primary curing assembly, where each degree of cure in the difference is determined by Eq. (1). This difference may also be referred to as the increase in the degree of cure of the primary coating composition in the secondary curing assembly. Analogous definitions apply in embodiments in which the degree of cure of the primary coating composition is increased in the ink tertiary curing assembly or a combination of the secondary curing assembly and the ink tertiary curing assembly.

In one embodiment, the size of the curing assemblies 26, the number and intensity of the LED light sources in curing assemblies 26, the speed of the draw, thickness of the coatings and the choice of the photoinitiator for the primary, secondary and ink tertiary coating compositions in combination with the light sources for curing the primary, secondary and ink tertiary coating compositions are selected such that only a portion of the curing of the primary coating composition occurs in the primary curing assembly 26A and a significant amount of curing of the primary coating composition occurs when a partially cured primary coating composition is traveling through the secondary coating assembly 26B and/or the ink tertiary curing assembly 26C. In the embodiment, the overall degree of cure of the primary coating achieved on the coated optical fiber 10 after all curing is completed may be in the range of 80% to 100%, and may be greater than 85%, or greater than 90% and may be less than 97%, according to various embodiments. Prior to applying the secondary coating in one embodiment, the curing of the primary coating composition in the primary coating assembly 26A is achieved with LEDs. In some embodiments, the degree of cure that the primary coating composition undergoes following application of the secondary coating composition to the partially cured primary coating composition in the secondary coating assembly 26B is between about 15% and 50%. That is, the degree of cure of the primary coating composition that occurs in the secondary coating assembly 26B or in the combination of secondary coating assembly 26B and ink tertiary coating assembly 26C is between 15% and 50%. In other embodiments, the degree of cure of the primary coating composition in the secondary coating assembly 26B or in the combination of the secondary coating assembly 26B and the ink tertiary coating assembly 26C is between 20% and 50%. That is, the degree of cure of the partially cured primary coating composition following application of the secondary coating composition to the partially cured primary coating composition is between 20% and 50%. In still further embodiments, the degree of cure of the primary coating composition in the secondary coating assembly 26B or in the combination of secondary coating assembly 26B and the ink tertiary coating assembly 26C is between 30% and 50%. That is, the degree of cure of the partially cured primary coating composition following application of the secondary coating composition to the partially cured primary coating composition is between 30% and 50%.

One example of a primary coating composition is illustrated in Table 2 below.

TABLE 2

| Coating Composition | |
| --- | --- |
| Component | Amount |
| Oligomeric Material | 49.10 wt % |
| Sartomer SR504 | 45.66 wt % |
| V-CAP/RC | 1.96 wt % |
| Photoinitiator TPO | 1.47 wt % |
| 1035 | 0.98 wt % |
| Adhesion Promoter | 0.79 wt % |
| Tetrathiol | 0.03 wt % |

According to one example, the oligomeric material may include an H12MDI Mole Number (n) of 3.7, an HEA Mole Number of (m) of 3.4, a PPG4000 Mole Number (p) of 2.0 and a Di-adduct weight percentage of 3.7, as described in U.S. Patent Application Publication No. 2018/0127593 A1 which is hereby incorporated herein by reference.

Sartomer SR504 is ethoxylated(4)nonylphenol acrylate (available from Sartomer). V-CAP/RC is N-vinylcaprolactam (available from ISP Technologies). TPO is 2,4,6-trimethylbenzoyl)diphenyl phosphine oxide (available from BASF under the trade name Lucirin and functions as a photoinitiator). 1035 is thiodiethylene bis[3-(3,5-di-tert-butyl)-4-hydroxy-phenyl) propionate] (available from BASF under the trade name Irganox 1035) and functions as an antioxidant. The adhesion promoters may include 3-acryloxypropyl trimethoxysilane (available from Gelest) or 3-mercaptopropyl trimethoxysilane (available from Aldrich). Tetrathiol is a catalyst quencher.

One example of the primary coating and the corresponding thickness, curing lamp type, and concentration and attenuation properties of the photoinitiator are illustrated in Table 3.

TABLE 3

| Coating | Primary |
| --- | --- |
| Primary Coating Thickness (microns) | 32.5 |
| Wavelength of LED (nm) | 395 |
| Molar Concentration of Photoinitiator (mol/L) in primary coating composition | 0.043 |
| Molar Absorption Coefficient of Photoinitiator at 395 nm (L/mol/cm) | 418 |

In some embodiments, the Molar Absorption Coefficient of the photoinitiator at the LED emitting wavelength is greater than 100 L/mol/cm. In other embodiments, the Molar Absorption Coefficient of the photoinitiator at the LED emitting wavelength is greater than 200 L/mol/cm. In still other embodiments, the Molar Absorption Coefficient of the photoinitiator at the LED emitting wavelength is greater than 400 L/mol/cm. In some embodiments, the molar concentration of the photoinitiator in the primary coating composition is greater than 0.01 mol/L. In other embodiments, the molar concentration of the photoinitiator in the primary coating composition is greater than 0.02 mol/L. In still other embodiments, the molar concentration of the photoinitiator in the primary coating composition is greater than 0.04 mol/L.

For the primary coating and the LED curing source operating at a peak wavelength of 395 nm shown in Table 3, the degree of cure for the primary coating at the exit of the primary curing assembly for different combinations of primary curing assembly lengths, draw speeds and LED lamp intensities on the fiber (that is, at the surface of the primary coating composition at the time of curing) is illustrated below in Tables 4-6, according to various examples.

TABLE 4

| Draw Speed (m/s) | Primary Coating Cure Stack System Length (m) | | |
|---|---|---|---|
| | 1.27 Intensity = 12 W/cm² | 1.27 Intensity = 24 W/cm² | 1.27 Intensity = 48 W/cm² |
| 50 | 73.6 | 84.9 | 92.9 |
| 60 | 67.4 | 79.9 | 89.8 |
| 70 | 62.2 | 75.3 | 86.5 |
| 80 | 57.4 | 70.8 | 83 |
| 100 | 50 | 63.1 | 76.5 |

The degree of cure for the primary coating at the exit of the primary curing assembly for different combinations of draw speed and intensity on the fiber for a primary curing assembly having light sources that extend over a length of 1.27 meters is shown in Table 4.

TABLE 5

| Draw Speed (m/s) | Primary Coating Cure Stack System Length (m) | | |
|---|---|---|---|
| | 1.02 Intensity = 12 W/cm² | 1.02 Intensity = 24 W/cm² | 1.02 Intensity = 48 W/cm² |
| 50 | 66.3 | 79 | 89 |
| 60 | 60 | 73.2 | 84.9 |
| 70 | 54.7 | 68.1 | 80.8 |
| 80 | 50.3 | 63.4 | 76.7 |
| 100 | 43 | 55.4 | 69 |

The degree of cure for the primary coating at the exit of the primary curing assembly for different combinations of draw speed and intensity on the fiber for primary curing assembly having light sources that extend over a length of 1.02 meters is shown in Table 5.

TABLE 6

| Draw Speed (m/s) | Primary Coating Cure Stack System Length (m) | | |
|---|---|---|---|
| | 0.76 Intensity = 12 W/cm² | 0.76 Intensity = 24 W/cm² | 0.76 Intensity = 48 W/cm² |
| 50 | 56 | 69.5 | 82 |
| 60 | 50 | 63.1 | 76.5 |
| 70 | 45.5 | 57.7 | 71.3 |
| 80 | 40.8 | 52.9 | 66.5 |
| 100 | 34.4 | 45.5 | 58.3 |

The degree of cure for the primary coating at the exit of the primary curing assembly for different combinations of draw speed and intensity on the fiber for the primary curing assembly having light sources that extend over a length of 0.76 meters is shown in Table 6.

As apparent from Tables 4-6 above, the degree of cure at high draw speed is significantly less than the desired cure conversion required in finished optical fiber products. In these examples, additional curing of the first or primary coating composition is achieved by selecting photoinitiators and radiation curing lamps such that additional primary coating composition cure between about 15% and 50% occurs in the secondary (second) curing assembly and/or ink tertiary (third) curing assembly. In each of these examples, the degree of cure of the primary coating in the finished optical fiber product is greater than 80%, where "finished optical fiber product" refers to the state of the coated fiber after it exits the last curing assembly of the draw process. In some embodiments, the degree of cure of the primary coating in the finished optical fiber product after all curing is completed is greater than about 85%. In other embodiments, the degree of cure of the primary coating in the finished optical fiber product is greater than about 90%. In still further other embodiments, the degree of cure of the primary coating in the finished optical fiber product is less than 97%. It should be appreciated that a dark cure phenomena may exist where the propagation and termination reactions continue to cure the composition even after the curing light source is turned off. The dark cure phenomena may result in up to 2% to 4% of additional curing.

When manufacturing an optical fiber comprising radiation curing of the primary coating compositions at fiber draw speeds larger than 50 m/sec to achieve an overall primary coating degree of cure in the finished optical fiber product greater than 80%, the UV radiation curing may be performed using an LED source emitting curing radiation with intensity greater than 10 W/cm² and an exposure time to curing radiation in the primary curing assembly of more than 10 ms, wherein the coating is applied in a coating applicator at a temperature, $T_1$ that is in the range of about 30° C. to about 70° C. In other embodiments, the coating is applied in a coating applicator at a temperature in the range of about 40° C. to about 60° C. In some embodiments, the draw speeds may be about 60 m/s 70 m/s and 80 m/s.

Figure 5:
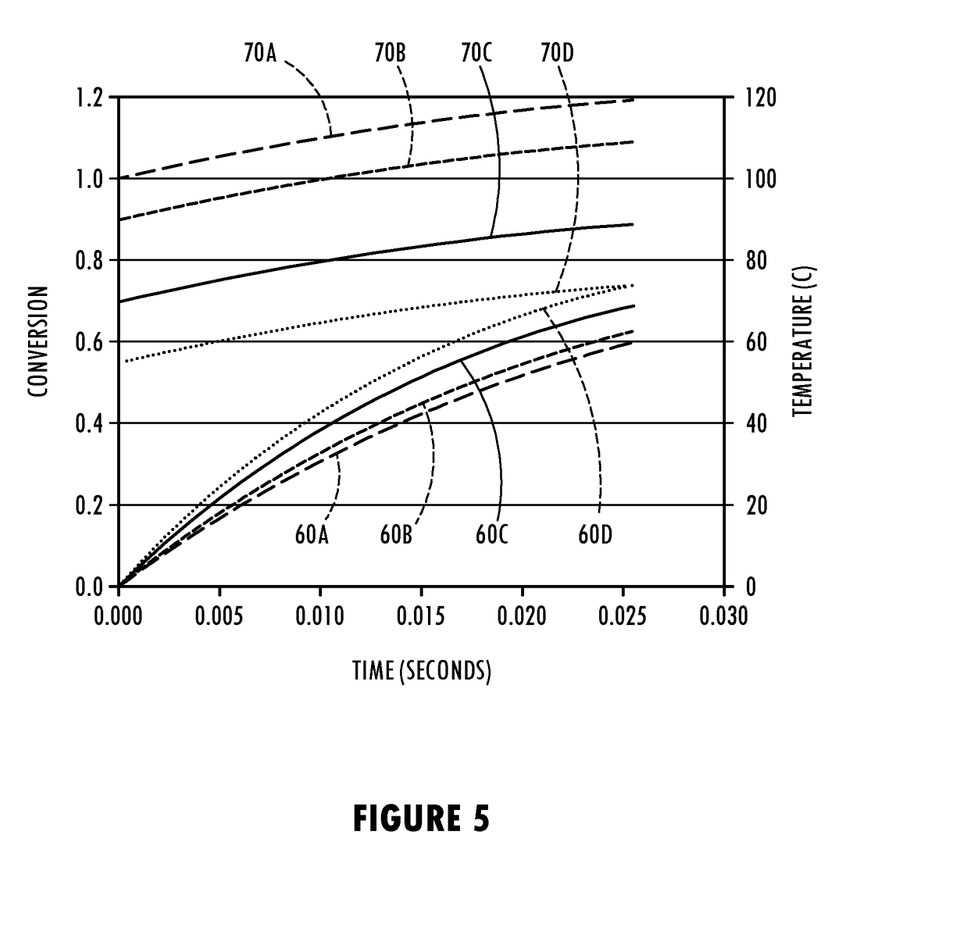
FIG. 5 is a graph illustrating the degree of cure in a primary coating stack curing assembly as a function of exposure time and coating application temperature, according to one example.

FIG. 5 illustrates the evolution of degree of cure of the primary coating in the primary coating curing assembly as a function of exposure time in the primary coating curing assembly and the coating application temperature. In the examples shown, the degree of cure is shown at different temperatures of 55° C., 70° C., 90° C. and 100° C. with a draw speed of 50 m/s and using five LED arrays at 60% LED power of about 12.45 w/cm² through a curing exposure time of 0 to 0.030 seconds. The lines 60A-60D identify the amount of cure on a scale of 0.0 to 1.0 which correlates to the percentage of cure of the primary coating at a selected temperature and throughout an exposure time. Line 60A illustrates a starting temperature of 100° C., line 60B illustrates a starting temperature of 90° C., line 60C illustrates a starting temperature of 70° C., and line 60D illustrates a starting temperature of 55° C. It should be appreciated that the temperature of the primary coating may tend to increase when exposed to the curing radiation because of the heat generated by the coating curing reaction.

Lines 70A-70C illustrate the temperature of the primary coating throughout the exposure time. Line 70A shows a starting temperature of 100° C. rising up to a temperature of about 120° C., line 70B shows a starting temperature of 90° C. rising up to a temperature of about 110° C., line 70C shows a starting temperature of 70° C. rising up to a temperature of about 90° C., and line 70D shows a starting temperature of 55° C. rising up to a temperature of about 75° C. As such, the temperature experienced during the curing process will tend to increase depending on the exposure time and the power of the light sources employed.

The permeability of oxygen, nitrogen and carbon dioxide gases in the primary coating as a function of temperature are listed below in Table 7.

TABLE 7

| Temperature [° C.] | Permeability $O_2$ at 298K (cc STP*cm/ cm²*Pa*sec) | Permeability $N_2$ at 298K (cc STP*cm/ cm²*Pa*sec) | Permeability $CO_2$ at 298K (cc STP*cm/ cm²*Pa*sec) |
|---|---|---|---|
| 25 | 2.60E-13 | 7.43E-14 | 1.34E-12 |
| 30 | 3.73E-13 | 1.06E-13 | 1.92E-12 |
| 35 | 5.29E-13 | 1.51E-13 | 2.72E-12 |
| 40 | 7.41E-13 | 2.11E-13 | 3.81E-12 |
| 45 | 1.03E-12 | 2.93E-13 | 5.28E-12 |
| 50 | 1.41E-12 | 4.02E-13 | 7.24E-12 |
| 55 | 1.92E-12 | 5.46E-13 | 9.84E-12 |
| 60 | 2.58E-12 | 7.36E-13 | 1.33E-11 |
| 65 | 3.44E-12 | 9.82E-13 | 1.77E-11 |
| 70 | 4.56E-12 | 1.30E-12 | 2.34E-11 |
| 75 | 5.99E-12 | 1.71E-12 | 3.07E-11 |
| 80 | 7.80E-12 | 2.22E-12 | 4.01E-11 |
| 85 | 1.01E-11 | 2.88E-12 | 5.18E-11 |
| 90 | 1.30E-11 | 3.69E-12 | 6.65E-11 |
| 95 | 1.65E-11 | 4.71E-12 | 8.49E-11 |
| 100 | 2.09E-11 | 5.97E-12 | 1.08E-10 |

Table 8 below illustrates the degree of cure (between 0 and 1, a degree of cure of 1 corresponds to 100% cure) at the exit of the primary coating stack and an intensity of 12.45 W/m² and different combinations of draw speeds and coating application temperature.

TABLE 8

| Coating Application Temp [° C.] | Draw Speed 50 m/s | Draw Speed 60 m/s | Draw Speed 70 m/s | Draw Speed 80 m/s |
|---|---|---|---|---|
| 45 | 0.776 | 0.72 | 0.667 | 0.622 |
| 55 | 0.742 | 0.683 | 0.628 | 0.583 |
| 70 | 0.692 | 0.628 | 0.574 | 0.53 |
| 90 | 0.628 | 0.565 | 0.511 | 0.467 |
| 100 | 0.599 | 0.535 | 0.482 | 0.44 |

In Table 9 below, the degree of cure at the exit of the primary coating stack and an intensity of 25 W/m² and different combination of draw speeds and coating application temperature are illustrated.

TABLE 9

| Coating Application Temp [° C.] | Draw Speed 50 m/s | Draw Speed 60 m/s | Draw Speed 70 m/s | Draw Speed 80 m/s |
|---|---|---|---|---|
| 45 | 0.879 | 0.836 | 0.793 | 0.753 |
| 55 | 0.855 | 0.807 | 0.76 | 0.7 |
| 70 | 0.817 | 0.762 | 0.71 | 0.665 |
| 90 | 0.763 | 0.703 | 0.646 | 0.6 |
| 100 | 0.737 | 0.674 | 0.616 | 0.57 |

The primary coating degree of cure is shown increasing with decreasing coating application temperature. This increase in degree of cure may be primarily due to the suppression of the chain transfer reactions at lower temperature that can negatively impact the propagation of the curing polymerization reaction. However, lower application temperature results in a decrease in the permeability of gases that can dissolve in the coating during the application process. As seen in Table 7 which shows the permeability of oxygen, nitrogen and carbon dioxide gases in primary coating as a function of temperature, some of the gases can be entrained in the coating inside the applicator during coating application at high draw speeds. Lower permeability at lower application temperature can result in formation of gas bubbles that can negatively impact the integrity of the applied coating layer. Thus, the choice of the application temperature may be an optimization between achieving a high degree of cure at high draw speeds and bubble-free coatings. In some embodiments, the coating may be applied in a coating applicator at a temperature in the range of about 40° C. to 70° C. or more particularly in the range of about 45° C. to 60° C.

Figure 6:
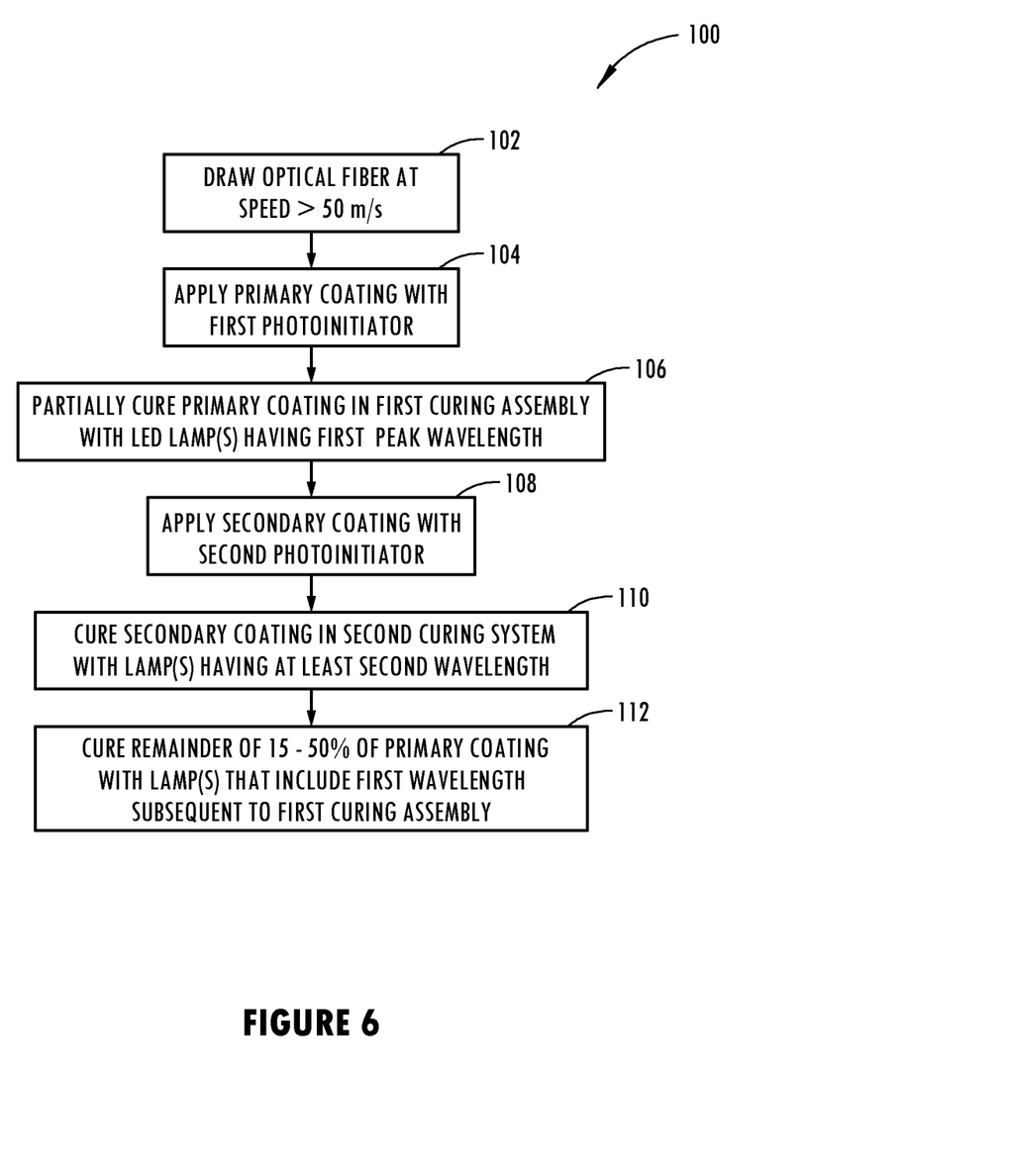
FIG. 6 is a flow diagram illustrating the method of coating and curing the optical fiber, according to one embodiment.

Referring to FIG. 6, the method of coating an optical fiber is generally illustrated, according to one embodiment. Method 100 begins at step 102 in which optical fiber is drawn at a speed of greater than 50 m/sec, such as 60 m/sec, 70 m/sec, 80 m/sec, 100 m/sec, or greater. Next, the first or primary coating composition with a first photoinitiator is applied to the fiber at step 104. At step 106, method 100 partially cures the primary coating composition in the first curing assembly with LED lamps emitting a first wavelength that corresponds to an absorption wavelength of the first photoinitiator in the primary coating composition. The absorption wavelength of the photoinitiator has a peak absorption and expands over a spectrum of wavelengths. The LED lamps emit light over a narrow band of wavelengths that overlap with the spectrum of wavelengths of absorption of the photoinitiator. To cure the composition, the molar absorption coefficient of the photoinitiator has a value greater than 100 L/mole$^{-1}$/cm$^{-1}$, according to one embodiment. According to other embodiments, the molar absorption coefficient value is greater than 200 L/mole$^{-1}$/cm$^{-1}$ and 400 L/mole$^{-1}$/cm$^{-1}$. Next, at step 108, method 100 applies the second or secondary coating composition with a second photoinitiator directly on the partially cured primary coating composition. Thereafter, the second coating composition is cured in the second curing assembly with lamps that radiate at a second wavelength that corresponds to an absorption wavelength of the second photoinitiator in the secondary coating composition. Finally, at step 112, an additional 15-50% degree of cure of the primary coating composition is achieved with lamps that emit radiation of the first wavelength in the second curing assembly (i.e. downstream of or subsequent to the first curing assembly in the draw process). This may be achieved in one embodiment by employing a broad radiation emission device such as a mercury lamp or an arc lamp in the secondary curing assembly and/or third curing assembly that emits the first wavelength and the second wavelength so as to cure both the primary coating composition and the secondary coating composition in the secondary coating assembly. In another embodiment, the secondary coating assembly includes LED lamps that emit both the first wavelength and the second wavelength such that the first and second coating compositions are both cured in the secondary curing assembly.

Accordingly, the optical fiber draw system and method advantageously employs LEDs to emit radiation to cure the primary and second coating compositions of an optical fiber at high draw speeds in which the degree of cure of the primary coating composition advances by 15-50% after the fiber exits the first curing assembly.

Aspect 1 of the description is:
An optical fiber draw system comprising:
a furnace for heating an optical fiber preform;
a draw assembly for drawing a glass fiber from the optical fiber preform at a draw speed greater than 50 meters per second;
a first coating applicator for applying a first coating composition onto the glass fiber, the first coating composition comprising a first photoinitiator, the first photoinitiator absorbing at a first wavelength;

a first curing assembly comprising a first plurality of light sources comprising light-emitting diodes, the first plurality of light sources emitting at the first wavelength, the first curing assembly configured to cure the first coating composition to a first degree of cure with the emission at the first wavelength;

a second coating applicator for applying a second coating composition onto the first coating composition having the first degree of cure, the second coating composition comprising a second photoinitiator, the second photoinitiator absorbing at a second wavelength; and a second curing assembly comprising a second plurality of light sources, the second plurality of light sources emitting at the second wavelength, the second curing assembly configured to cure the second coating composition with the emission at the second wavelength, the second curing assembly further configured to cure the first coating composition to a second degree of cure;

wherein a difference between the second degree of cure and the first degree of cure is in the range of 15%-50%.

Aspect 2 of the description is:
The system of Aspect 1, wherein the first wavelength equals the second wavelength.

Aspect 3 of the description is:
The system of Aspect 1, wherein the first wavelength is a peak absorption wavelength of the first photoinitiator and the second wavelength is a peak absorption wavelength of the second photoinitiator and the first wavelength differs from the second wavelength.

Aspect 4 of the description is:
The system of Aspect 3, wherein the first plurality of light-emitting diodes has a first peak wavelength that is operable to activate the first photoinitiator and the second plurality of light sources has a second peak wavelength that is operable to activate the second photoinitiator.

Aspect 5 of the description is:
The system of Aspect 4, wherein the second plurality of light sources has a peak wavelength that further activates the first photoinitiator.

Aspect 6 of the description is:
The system of Aspect 4 or 5, wherein the second plurality of light sources comprises one or more light sources having a broad wavelength peak that activates both the first and second photoinitiators.

Aspect 7 of the description is:
The system of Aspect 6, wherein the second plurality of light sources comprises at least one mercury discharge lamp.

Aspect 8 of the description is:
The system of any of Aspects 1-7, wherein the first degree of cure is in the range of 20%-50%.

Aspect 9 of the description is:
The system of any of Aspects 1-7, wherein the first degree of cure is in the range of 30%-50%.

Aspect 10 of the description is:
The system of any of Aspects 1-9, wherein the second degree of cure is greater than 85%.

Aspect 11 of the description is:
The system of any of Aspects 1-10, wherein the first wavelength is a peak emission wavelength of the first plurality of light sources.

Aspect 12 of the description is:
The system of Aspect 11, wherein the first wavelength is a peak absorption wavelength of the first photoinitiator.

Aspect 13 of the description is:
The system of any of Aspects 1-12, wherein the second wavelength is a peak emission wavelength of the second plurality of light sources.

Aspect 14 of the description is:
The system of Aspect 13, wherein the second wavelength is a peak absorption wavelength of the second photoinitiator.

Aspect 15 of the description is:
The system of any of Aspects 1-14, wherein the first photoinitiator absorbs the second wavelength.

Aspect 16 of the description is:
The system of any of Aspects 1-15, wherein the difference between the second degree of cure and the first degree of cure is in the range of 30%-50%.

Aspect 17 of the description is:
The system of any of Aspects 1-16, wherein the first coating composition applied by the first coating applicator is applied at a temperature in the range of 30° C. to about 70° C.

Aspect 18 of the description is:
The system of Aspect 17, wherein the first coating composition applied by the first coating applicator is applied at a temperature in the range of about 40° C. to about 60° C.

Aspect 19 of the description is:
A method of coating an optical fiber comprising:
drawing a glass fiber from an optical fiber preform at a draw speed greater than 50 meters per second;
applying a first coating composition directly onto the glass fiber, wherein the first coating composition comprises a first photoinitiator, the first photoinitiator absorbing at a first wavelength;
partially curing the first coating composition to a first degree of cure with a first plurality of light sources, the first plurality of light sources comprising a first plurality of light-emitting diodes, the first plurality of light-emitting diodes emitting the first wavelength;
applying a second coating composition directly onto the partially cured first coating composition having the first degree of cure, the second coating composition comprising a second photoinitiator, the second photoinitiator absorbing a second wavelength; and
at least partially curing the second coating composition with a second plurality of light sources, the second plurality of light sources emitting the second wavelength, the second plurality of light sources further curing the partially cured first coating composition to a second degree of cure;
wherein a difference between the second degree of cure and the first degree of cure is in the range of 15%-50%.

Aspect 20 of the description is:
The method of Aspect 19, wherein the first wavelength is different from the second wavelength.

Aspect 21 of the description is:
The method of Aspect 19 or 20, wherein the second plurality of light sources comprises a first light-emitting diode emitting at the first wavelength and a second light-emitting diode emitting at the second wavelength.

Aspect 22 of the description is:
The method of any of Aspects 19-21, wherein the second plurality of light sources comprises a broadband light source.

Aspect 23 of the description is:
The method of Aspect 22, wherein the broadband light source comprises a mercury discharge lamp.

Aspect 24 of the description is:
The method of any of Aspects 19-23, wherein the first degree of cure is in the range from 20%-50%.

Aspect 25 of the description is:
The method of any of Aspects 19-23, wherein the second degree of cure is in the range from 80%-99%.

Aspect 26 of the description is:
The method of any of Aspects 19-25, wherein the first photoinitiator absorbs the second wavelength.

Aspect 27 of the description is:

The method of any of Aspects 19-26, wherein the second plurality of light sources further emits the first wavelength.

Aspect 28 of the description is:

The method of any of Aspects 19-27, wherein the first wavelength is a peak emission wavelength of the first plurality of light sources.

Aspect 29 of the description is:

The method of Aspect 28, wherein the first wavelength is a peak absorption wavelength of the first photoinitiator.

Aspect 30 of the description is:

The method of any of Aspects 19-29, wherein the second wavelength is a peak emission wavelength of the second plurality of light sources.

Aspect 31 of the description is:

The method of Aspect 30, wherein the second wavelength is a peak absorption wavelength of the second photoinitiator.

Aspect 32 of the description is:

The method of any of Aspects 19-31, wherein the difference between the second degree of cure and the first degree of cure is in the range of 30%-50%.

Aspect 33 of the description is:

The method of any of Aspects 19-32, further comprising:

applying a third coating composition directly on the at least partially cured second coating composition, the third coating composition comprising a third photoinitiator, the third photoinitiator absorbing at a third wavelength; and at least partially curing the third coating composition with a third plurality of light sources, the third plurality of light sources emitting the third wavelength, the third plurality of light sources further curing the partially cured first coating composition to a third degree of cure.

Aspect 34 of the description is:

The method of Aspect 33, wherein the third degree of cure is in the range of 80%-99%.

Aspect 35 of the description is:

The method of Aspect 33 or 34, wherein a difference between the third degree of cure and the second degree of cure is at least 5%.

Aspect 36 of the description is:

The method of any of Aspects 19-35, wherein the first coating composition applied by the first coating applicator is applied at a temperature in the range of 30° C. to about 70° C.

Aspect 37 of the description is:

The method of Aspect 36, wherein the first coating composition applied by the first coating applicator is applied at a temperature in the range of about 40° C. to about 60° C.

The described embodiments are preferred and/or illustrated, but are not limiting. Various modifications are considered within the purview and scope of the appended claims.

What is claimed is:

1. An optical fiber draw system comprising:
a furnace for heating an optical fiber preform;
a draw assembly for drawing a glass fiber from the optical fiber preform at a draw speed greater than 50 meters per second;
a first coating applicator for applying a first coating composition onto the glass fiber, the first coating composition comprising a first photoinitiator, the first photoinitiator absorbing at a first wavelength;
a first curing assembly comprising a first plurality of light sources comprising light-emitting diodes, the first plurality of light sources emitting at the first wavelength, the first curing assembly configured to cure the first coating composition to a first degree of cure with the emission at the first wavelength in a time of 0.030 seconds or less;
a second coating applicator for applying a second coating composition onto the first coating composition having the first degree of cure, the second coating composition comprising a second photoinitiator, the second photoinitiator absorbing at a second wavelength; and
a second curing assembly comprising a second plurality of light sources, comprising a combination of light emitting diodes and at least one mercury discharge lamp, the second plurality of light sources emitting at the second wavelength, the second curing assembly configured to cure the second coating composition with the emission at the second wavelength, the second curing assembly further configured to cure the first coating composition to a second degree of cure;
wherein the first degree of cure is in the range from 20%-50% and the second degree of cure is in the range from 80%-99%.

2. The system of claim 1, wherein the first wavelength is a peak absorption wavelength of the first photoinitiator and the second wavelength is a peak absorption wavelength of the second photoinitiator and the first wavelength differs from the second wavelength.

3. The system of claim 2, wherein the first plurality of light-emitting diodes has a first peak wavelength that is operable to activate the first photoinitiator and the second plurality of light sources has a second peak wavelength that is operable to activate the second photoinitiator.

4. The system of claim 3, wherein the second plurality of light sources has a peak wavelength that further activates the first photoinitiator.

5. The system of claim 3, wherein the second plurality of light sources comprises one or more light sources having a broad wavelength peak that activates both the first and second photoinitiators.

6. The system of claim 1, wherein the first wavelength is a peak emission wavelength of the first plurality of light sources.

7. The system of claim 6, wherein the first wavelength is a peak absorption wavelength of the first photoinitiator.

8. The system of claim 1, wherein the second wavelength is a peak emission wavelength of the second plurality of light sources.

9. The system of claim 8, wherein the second wavelength is a peak absorption wavelength of the second photoinitiator.

10. The system of claim 1, wherein a difference between the second degree of cure and the first degree of cure is in the range of 15%-50%.

11. A method of coating an optical fiber comprising:
drawing a glass fiber from an optical fiber preform at a draw speed greater than 50 meters per second;
applying a first coating composition directly onto the glass fiber, wherein the first coating composition comprises a first photoinitiator, the first photoinitiator absorbing at a first wavelength;
partially curing the first coating composition to a first degree of cure with a first curing assembly having a first plurality of light sources, the first plurality of light sources comprising a first plurality of light-emitting diodes, the first plurality of light-emitting diodes emitting the first wavelength in a time of 0.030 seconds or less;
applying a second coating composition directly onto the partially cured first coating composition having the first degree of cure, the second coating composition comprising a second photoinitiator, the second photoinitiator absorbing a second wavelength; and at least partially curing the second coating composition with a second curing assembly having a second plurality of light sources, comprising a combination of light emitting diodes and at least one mercury discharge lamp, the second plurality of light sources emitting the second wavelength, the second plurality of light sources further curing the partially cured first coating composition to a second degree of cure;

wherein the first degree of cure is in the range from 20%-50% and the second degree of cure is in the range of from 80%-99%.

12. The method of claim 11, wherein the first wavelength is different from the second wavelength.

13. The method of claim 11, wherein the first photoinitiator absorbs the second wavelength.

14. The method of claim 11, wherein the difference between the second degree of cure and the first degree of cure is in the range of 30%-50%.

15. The method of claim 11, further comprising:

applying a third coating composition directly on the at least partially cured second coating composition, the third coating composition comprising a third photoinitiator, the third photoinitiator absorbing at a third wavelength; and at least partially curing the third coating composition with a third plurality of light sources, the third plurality of light sources emitting the third wavelength, the third plurality of light sources further curing the partially cured first coating composition to a third degree of cure.

16. The method of claim 15, wherein the third degree of cure is in the range of 80%-99%.

17. The method of claim 15, wherein a difference between the third degree of cure and the second degree of cure is at least 5%.

18. The method of claim 11, wherein the first coating composition applied by the first coating applicator is applied at a temperature in the range of 30° C. to about 70° C.

19. The method of claim 11, wherein a difference between the second degree of cure and the first degree of cure is in the range of 15%-50%.

* * * * *

UNITED STATES PATENT AND TRADEMARK OFFICE
CERTIFICATE OF CORRECTION

PATENT NO. : 11,407,682 B2
APPLICATION NO. : 16/930723
DATED : August 9, 2022
INVENTOR(S) : Dana Craig Bookbinder et al.

It is certified that error appears in the above-identified patent and that said Letters Patent is hereby corrected as shown below:

In the Claims

In Column 21, Line 13 (approx.), in Claim 11, before "from" delete "of".

Signed and Sealed this
Twenty-second Day of November, 2022

Katherine Kelly Vidal
*Director of the United States Patent and Trademark Office*